Oct. 14, 1941.         L. M. ROBERTS         2,259,046
TREATMENT OF SEWAGE BY ELECTRODIALYSIS
Filed Nov. 18, 1936
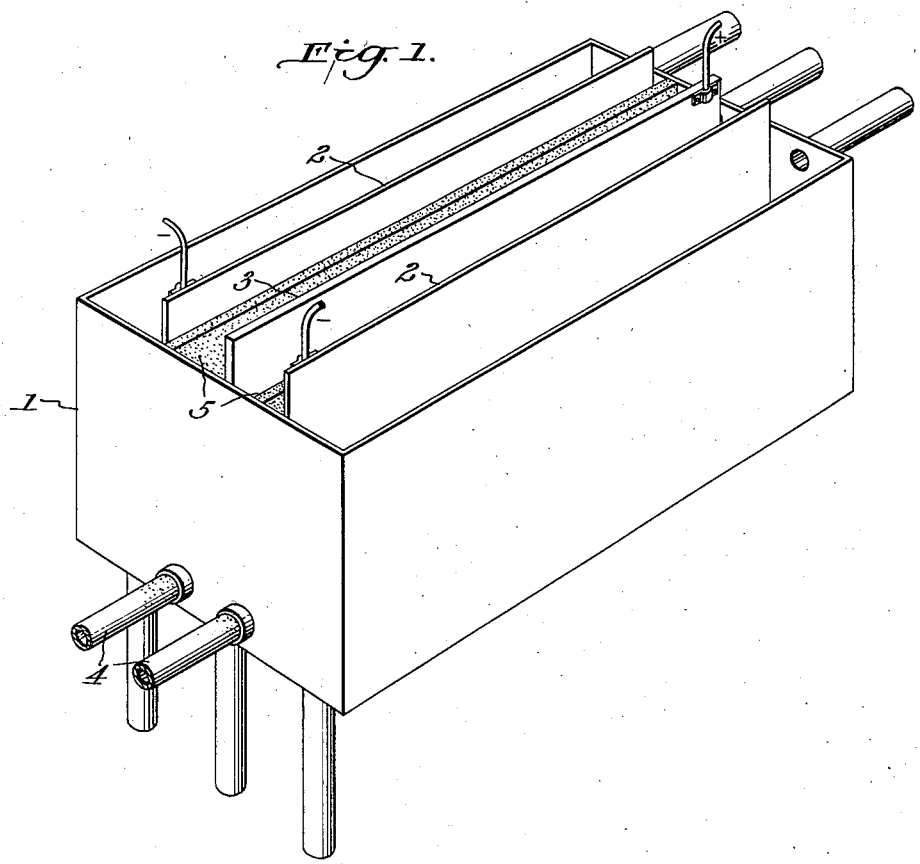
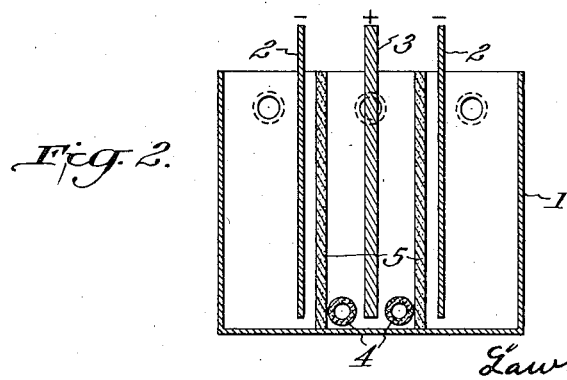
Inventor:
Lawrence M. Roberts
By Potter, Pierce & Scheffler
his Attorneys.

Patented Oct. 14, 1941

2,259,046

UNITED STATES PATENT OFFICE 2,259,046

TREATMENT OF SEWAGE BY ELECTRO-DIALYSIS

Lawrence M. Roberts, Bridgewater Township, Somerset County, N. J., assignor to Research Corporation, New York, N. Y., a corporation of New York Application November 18, 1936, Serial No. 111,499

5 Claims. (Cl. 204—151)

This invention relates to an improvement in the treatment of sewage by electro-dialysis.

In the method for the electro-dialysis of sewage, described in an application in the name of Edgar A. Slagle, Serial No. 8,911, filed March 1, 1935, (since abandoned and of which application Serial No. 146,688 was filed as a continuation-in-part, on June 5, 1937, the latter having matured into Patent No. 2,158,595) sewage, after a rough separation of coarse solids, is delivered, preferably with the addition of a coagulant, to the cathode compartment of an electrolytic cell separated from the anode compartment by a semi-permeable diaphragm. The sewage is subjected to electro-dialysis in the cathode compartment whereby its pH value is increased and a portion of its colloidal solids content is flocculated and rendered separable mechanically, e. g. by sedimentation or filtration. The solids are separated, producing a sludge and an effluent, which latter ordinarily is suitable for discharge into public waterways. The sludge still contains a considerable amount of water and is otherwise objectionable as a finished product and is delivered into the anode compartment of the cell where it is subjected to electro-dialysis against the sewage in the cathode compartment. This treatment of the sludge reduces its pH value and results in dewatering the sludge, i. e. the sludge solids are coagulated further and rendered more completely separable by filtration from the liquid. The treated sludge is then subjected to mechanical separation, e. g. filtration or settling or decantation. The liquid or filtrate may be discharged into public waterways and the sludge solids may be disposed of, e. g. by burning them. Said Slagle application discloses the aeration and agitation of the sewage in the cathode compartment of the electrolytic cell.

Now I have found that a suitably controlled aeration of the sludge during its treatment in the anode compartment of the cell aids the treatment materially. With aeration the electro-dialysis of the sludge can be carried to the desired end point for good filtration more uniformly and generally in less time and with less power consumption than without aeration. The aeration has special merit in the treatment of certain refractory sludges which do not readily respond to the electro-dialysis. As compared with sludge which has been subjected to electro-dialysis without aeration, that produced with aeration settles more rapidly, has a lighter color and a less offensive odor, and filters to a solid residue having a higher solids content.

A result which is incidental but quite important is that the aeration increases the actual reduction in the quantity of sludge solids produced. In the Slagle process some destruction of sludge solids occurs, that is, as compared with certain known processes the Slagle process produces less sludge solids. No entirely satisfactory explanation of this loss of yield of sludge solids as a result of the electro-dialysis treatment of the sewage and sludge has been arrived at, but repeated careful tests have proved that a substantial destruction of sludge solids actually results from the electro-dialysis treatment. Possible explanations of this loss are that (1) a portion of the sludge solids is rendered soluble and is eliminated with the effluent, and (2) that organic matter is oxidized and passes off as gaseous products.

The anodic aeration of the sludge during the electro-dialysis materially increases this loss or destruction or elimination of sludge solids. In any event it will be appreciated that a reduction in the quantity of sludge solids produced without any apparent corresponding production of other objectionable products is a decided advantage in a large scale sewage disposal process.

Apparatus illustrating a suitable arrangement for the electro-dialysis of sewage with aeration of the sludge is illustrated in the accompanying drawing in which:

Fig. 1 is a perspective view, and
Fig. 2 is a vertical cross-section of the apparatus.

Referring to the drawing, 1 is a tank, 2, 2 the cathodes, 3 the anode, 4, 4 pipes for the introduction of air or other gas, and 5, 5 the diaphragms. The cathodes preferably are perforated or slotted and spaced a short distance, e. g. about .25 inch from the diaphragms. The diaphragms suitably are of asbestos fiber. The pipes 4, 4 may be standard ceramic diffuser tubes. Air or other gas is introduced under a slight pressure sufficient to result in the formation of small bubbles on the surface of the sludge. The flow of gas is controlled so as to avoid displacing the sludge to such an extent that the path of the material migrating to and through the diaphragm is interrupted. Uninterrupted paths for the migration of material under the influence of the electro-dialysis must be maintained. To this end the gas is introduced in the form of fine streams or bubbles which diffuse up through the sludge mass and gently agitate it without so disintegrating it as to render it a poor conductor for the electric current.

The action of air introduced as described is believed to be two-fold. (1) It produces oxidation of the sludge constituents and (2) it keeps the sludge in motion at the face of the diaphragm so that all parts of the sludge are exposed to the electro-dialytic action.

The beneficial effect of aeration is shown by the following data from comparative tests:

| Treatment | Sample 1 without aeration | Sample 2 with aeration |
|---|---|---|
| Time required..............hours.. | 2.75 | 1.75 |
| Power kw. hrs./ton solids............. | 591 | 469 |
| Percent solids in sludge before electro-dialysis.................. | 5.23 | 5.23 |
| Percent solids in sludge after electro-dialysis.................. | 5.02 | 3.41 |
| Percent solids in filter cake.............. | 15.7 | 48.7 |

As appears from the foregoing data, electro-dialysis of sewage sludge without aeration reduced the percentage of solids from 5.23 to 5.02, or about 4% reduction, but with aeration the solids were reduced to 3.41%, or about 35% reduction. The aeration also resulted in a shortening of the time required to bring the sludge to a satisfactory condition for filtration from 2.75 hours to 1.75 hours, the power consumption was reduced from 591 to 469, and the amount of liquid retained by the filter cake was greatly reduced as indicated by the figures 15.7% and 48.7% for the solids content of the respective filter cakes.

In order to show the double effect of aeration comparative tests were made using nitrogen and air as the aerating agents. The nitrogen serves to agitate the sludge without oxidation, while the air may serve to both agitate and oxidize the sludge. The results of the tests are as follows:

|  | Sample 1 | Sample 2 | Sample 3 |
|---|---|---|---|
| Percent solids untreated sludge............... | 6.56 | 6.56 | 6.56 |
| Kind of gas................ | Nitrogen | Air | Nitrogen |
| Time required.........hours.. | 4.58 | 3.42 | 4.83 |
| Percent loss of solids............ | 22.3 | 28 | 21.7 |
| Kw. hrs./ton solids............ | 225 | 198 | 267 |

These data clearly show that aeration with air gives improved results compared with those produced by aeration with inert gas. By comparing the results in the foregoing table for aeration with nitrogen, with the results in the previous table for operation without any aeration, it is seen that aeration with nitrogen gives a substantial improvement, e. g. with respect to power requirements and loss of solids.

I claim:

1. In the method of treating sewage involving subjecting the sewage to electro-dialysis in the cathode compartment of an electrolytic cell against sludge separated therefrom in the anode compartment through a diaphragm the step which consists in introducing a gas into the sludge in the anode compartment during the electro-dialysis thereof in quantity only sufficient to produce a mild agitation thereof adjacent the diaphragm.

2. Method of treating sewage as defined in claim 1 in which the gas is inert.

3. Method of treating sewage as defined in claim 1 in which the gas is an oxidizing gas.

4. Method of treating sewage as defined in claim 1 in which the gas is air.

5. Method of treating sewage as defined in claim 1 in which air is introduced into the sludge in fine streams adjacent the lower edge of a vertically disposed diaphragm in quantity sufficient to produce mild agitation of the sludge at least against the surface of the diaphragm but insufficient to disrupt the body of sludge.

LAWRENCE M. ROBERTS.